United States Patent [19]

Schaefer et al.

[11] 4,054,536

[45] Oct. 18, 1977

[54] PREPARATION OF AQUEOUS SILICA SOLS FREE OF ALKALI METAL OXIDES

[75] Inventors: David P. Schaefer, Hinsdale, Ill.; Linda Pluta Gamage, Jay, Maine

[73] Assignee: Nalco Chemical Company, Oak Brook, Ill.

[21] Appl. No.: 702,306

[22] Filed: July 2, 1976

Related U.S. Application Data

[63] Continuation-in-part of Ser. No. 535,760, Dec. 23, 1974, abandoned.

[51] Int. Cl.$^2$ ............................................. B01J 13/00
[52] U.S. Cl. ........................... 252/313 S; 106/287 S; 252/449
[58] Field of Search ............................. 252/313 S

[56] References Cited

U.S. PATENT DOCUMENTS

| | | | |
|---|---|---|---|
| 2,577,484 | 12/1951 | Rule | 252/313 S |
| 2,750,345 | 6/1956 | Alexander | 252/313 S |
| 2,833,724 | 5/1958 | Alexander et al. | 252/313 S |
| 3,342,747 | 9/1967 | Mindick et al. | 252/313 S |
| 3,582,494 | 6/1971 | Vossos et al. | 252/313 S |

*Primary Examiner*—Richard D. Lovering
*Attorney, Agent, or Firm*—John G. Premo; Robert A. Miller; Barry W. Sufrin

[57] ABSTRACT

A process for preparing silica sols substantially free of alkali metal ions which comprises:

A. Adding to a boiling aqueous solution of a lower alkanol amine a 2-10% by weight aqueous solution of silicic acid, the mole ratio of $SiO_2$ to lower alkanol amine being in the range of from 1:1 to 100:1;

B. Evaporating water during the addition of the silicic acid to the aqueous solution of the lower alkanol amine so as to maintain a constant volume;

C. Recovering the aqueous colloidal silica sol which is substantially free of alkali metal ions, said sol having a mole ratio of $SiO_2$ to alkanol amine in the range of 1:1 to 100:1; and then if desired, D. Treating this sol with both a cation and anion ion exchange resin so as to further deionize the resulting alkaline metal-free silica sol, as well as to remove substantial quantities of the alkanol amine. Then if an alkaline sol is desired, adjusting the pH of the resulting acid sol of Step D to between 9 and 10 with an aqueous solution of ammonia.

7 Claims, No Drawings

PREPARATION OF AQUEOUS SILICA SOLS FREE OF ALKALI METAL OXIDES

This is a continuation-in-part of our copending application Ser. No. 535,760 filed Dec. 23, 1974, now abandoned.

This invention is directed to a method for making aqueous colloidal silica sols which are substantially free of alkali metals. Silica sols are used in a variety of applications including the treatment of garments, use as refractory materials, as additives in paint, and as adhesives.

There are several existing applications for colloidal silica which require a low concentration of sodium, the stabilizing ion of most commercially available sols. In the manufacture of catalysts, silica is used as a binder, but the presence of any sodium, potassium, or lithium, is undesirable as it is a catalyst poison. Alkali metal concentration is also critical in the use of sols as binders for high temperature thermal insulation. When the insulation is subjected to temperatures of 2000° F or greater, sodium as well as other alkali metals act as fluxing agents, causing vitrification of the silica and consequently a breakdown in its binding ability. The need for alkali metal free silica sols has been known for many years and many attempts have been made to produce sols of this type commercially and economically for use in the above applications.

THE PRIOR ART

Weldes, U.S. Pat. No. 3,239,521 discloses a method of forming soluble sodium free hydroxylated organic quaternary nitrogen silicates. While producing a silica containing compound substantially free of sodium, Weldes does not form a sol and his ratio of quaternary to silica content is high. Another Weldes Patent U.S. Pat. No. 3,326,910 also discloses a method for the preparation of amine silicates which are substantially free of alkali metal ions. Again, the silicate used is reacted with an amine and the resulting amine silicate solution is apparently soluble in water.

Yates, U.S. Pat. No. 3,597,248 discloses a method of producing guanidine silicates. Again, the form of the silicate is water soluble and contains a large percentage of the organic amine. A second Yates Patent, U.S. Pat. No. 3,630,954 discloses colloidal silica sols having a high surface area which are stabilized by an organic amine and strong base.

Vossos et al. U.S. Pat. No. 3,582,494 discloses a method for producing alkaline aqueous colloidal silica sols from salt free acidic sols by treating such acidic sols with at least 0.003% by weight, based on the weight of the silica in such sol, of a salt whose anion is derived from a weak acid and whose ionization constant should not exceed that of carbonic acid in order to stabilize the sol. While Vossos apparently provides to the art a sol containing a low amount of alkali metal, even the alkali metal content which Vossos provides within his sol is deleterious in certain applications.

Rule, U.S. Pat. No. 2,577,484 discloses a process for producing stable silica sols having an $SiO_2$ to "base" molar ratio, expressed as "$M_2O$" being from 130:1 to 500:1. Rule also discloses a method for utilizing alkanol amines as a stabilizer.

Our invention is directed to the production of an aqueous colloidal silica sol containing less than 400 ppm of alkali metal ions, having an $SiO_2$ content of between 5 to 55% by weight and a molar ratio of $SiO_2$ to lower alkanol amine present in the aqueous heel of from 1:1 to 100:1.

It would be a desirable benefit to the art if it were possible to produce an alkali metal free silica sol for use in these applications. Such silica sol would not be an amine derivative, would have a long storage life, and could be easily manufactured using simple material handling techniques.

OBJECTS OF THE INVENTION

An object of this invention is to provide to the art an aqueous colloidal silica sol substantially free of alkali metal ions.

Another object of our invention is to provide to the art a stable acidic silica sol substantially free of alkali metal ions.

A further object of our invention is to provide to the art an acidic or alkaline silica sol containing less than 400 ppm of alkali metal ions, and containing 5 to 55% by weight as $SiO_2$.

THE INVENTION

The silica sols which are the subject of our invention are made by the following steps:
  A. Adding to a boiling aqueous solution of a lower alkanol amine a 2–10% by weight aqueous solution of silicic acid, the mole ratio of $SiO_2$ to lower alkanol amine being in the range of 1:1 to 100:1;
  B. Evaporating water during the addition of the silicic acid to the aqueous solution of the lower alkanol amine so as to maintain a constant volume;
  C. Recovering the aqueous colloidal silica sol which is substantially free of alkali metal ions, said sol having a molar ratio of $SiO_2$ to alkanol amine of 1:1 to 100:1; and then if desired,
  D. Treating this sol with both a cation and anion ion exchange resin so as to further deionize the resulting alkali metal free silica sol as well as to remove substantial quantities of the alkanol amine as well as resulting ions; and then,
  E. As a further step, an alkaline sol can be produced by adjusting the pH of the resulting acid sol of Step D between 9 to 10 with an aqueous solution of ammonia.

THE PROCESS

The alkanol amines which are useful as the starting heels in the process of our invention are those containing two to four carbon atoms with a terminal primary amine group, and a terminal hydroxyl group. Compounds following within this class include 2-amino ethanol 3-aminopropanol, and 4-aminobutanol. The preferred alkanol amine is 2-aminoethanol. The alkanol amine is used in a concentration of from 0.5 to 3% in an aqueous solution to form a starting heel in the production of our novel silica sols. The amount of lower alkanol amine used can vary, but is typically in the range of from about .01 to 1.0 moles of lower alkanol amine per mole of $SiO_2$ to be introduced into the system. This corresponds to a mole ratio of $SiO_2$: alkanol amine of from 1:1 to 100:1. Preferably, this ratio should be from 1:1 to 70:1 and most preferably, from 1:1 to 50:1. It is pointed out that these will be the approximate final ratios of $SiO_2$ to alkanol amine due to the fact that a small amount of alkanol amine may be lost during the concentration step through distillation. As a further guide in the selection of lower alkanol amine, the amine should be used in as low a level as possible within the above limits, since oftentimes these silica sold will be further deionized. The amount of alkanol amine should be kept low, since this material will be removed along with substantially all of any alkali metal ions which may be present when passed through a cation exchange resin.

In forming the silica sol through the use of the alkanol amine heel, it was necessary as part of the criteria of selecting a suitable alkanol amine to determine the amine loss through evaporation. This was done by titrating the material obtained by evaporation during the concentration step to obtain a concentrated volume with a weak acid to a methyl red end point. It was determined that with ethanol amine, the preferred lower alkanol amine, 5.0% or less was lost.

Many possible organic bases were tested before the final selection of our preferred alkanol amine was made. Among the bases tested include choline, guanidine, tetramethylammonium hydroxide, propane diamine, tetramethylethylene diamine, triethylenediamine, diethylenediamine, tetraethanolammonium hydroxide, tetraethylenepentamine, triethylene tetramine, and propane diamine. It is important in our invention that the organic base can be any base that does not contain an alkali metal.

The silicic acid which is added to the aqueous solution of a lower alkanol amine should be in an aqueous solution of between 2 to 10% by weight $SiO_2$. The silicic acid solutions customarily used in our invention are made by well-known techniques, and generally are made by passing a solution of commercially available sodium silicate through a cation exchange resin in the hydrogen form so as to remove the sodium. As seen, the silicic acid has already had the greater majority of alkali metal removed, and care should be taken in order not to introduce alkali metal contaminates into the system.

The silicic acid is added to the aqueous solution of the lower alkanol amine at or near the boiling point of the aqueous solution of the lower alkanol amine. While the addition of the silicic acid solution is proceeding, water should be evaporated from the system so as to keep a constant volume. Ideally the volume ratio of silicic acid solution which is to be added to the aqueous solution of the lower alkanol amine solution is from 3:1 to 7:1.

As previously stated, the temperature of the alkanol amine solution at the start of the addition of the silicic acid solution should be at or near the boiling point of the solution. Ideally, this temperature should be in the order of 100° C due to the small quantity of alkanol amine present and the need to remove water from the system as silicic acid is added. In considering the choice of an alkanol amine it is beneficial to pick a compound with a boiling point higher than that of water so that the amine does not boil off from the system as water is driven off, and which will remain water soluble during the course of the reaction.

If it is desired to produce a silica sol containing a very small particle size silica it has been found that rather than evaporating the alkanol amine solution at high temperature, it is preferred to employ a suitable vacuum at a lower temperature. By the use of this vacuum technique we have produced particle sizes as low as 3-4 millimicrons compared to the larger particle size sols produced at atmospheric pressures and high temperatures. With our method it is important to note that any range can be grown depending on time, concentration, and temperature.

After the silicic acid solution has been added to the lower alkanol amine solution, and the volume concentrated to a constant volume (the original volume of the alkanol amine solution) the silica sol formed may be recovered. This silica sol should be in a concentration of $SiO_2$ ranging from 5 to 55% and have a surface area of less than 800m²/gram as well as a pH in the range of 8 to 11. The resulting sol by this method will contain less than 400 ppm of an alkali metal.

If it is desired to further purify the resulting colloidal silica sol which is substantially free of alkali metals, the sol may be passed through ion exchange resins such as those disclosed by Mindick et al in U.S. Pat. No. 3,342,747 which is herein incorporated by reference. When a hydrogen form strong acid cation exchange resin is used in combination with a free base form weak base anion exchange resin, the finished sol treated with this method includes the steps of contacting the sol with an ion exchange system containing a hydrogen form strong acid cation exchange resin, allowing the thus treated sol to age under certain specific conditions, and subsequently again treating the aged sol with a hydrogen form strong acid cation resin. It is also beneficial, but, not essential that the sols be treated at least once with an anion exchange resin. The treatment with the anion exchange resin is only necessary when anions present in the sol would be deleterious in the application the sol is employed in. The treatment with the anion exchange resin can take place either before the aging step, after the aging step, or both before and after the aging step.

The ion exchange resin system used in the first step of the process may be either:

A. A hydrogen form strong acid cation exchange resin.
B. A hydrogen form strong acid cation exchange resin in combination with a hydroxide form strongly basic anion exchange resin, or,
C. A hydrogen form, strong acid cation exchange resin in combination with a free base form weak base anion exchange resin.

In the first step, silica sols having an $SiO_2$ concentration ranging from between 3% to as much as 55%, are contacted with any one of the ion exchange resin systems described above. The exchange operation may be conducted either as a batch operation using a resin slurry, or in a preferred embodiment, as a column operation.

The second step of the process comprises the aging of the sols treated by the ion exchange resin system. The treated sols should age at least one hour at a temperature not greater than the boiling point thereof with a preferred aging step being conducted at a temperature range between 40° to 120° F for at least 4 hours and most preferably between 16 to 24 hours.

While the aging process is most preferably conducted for the times and temperatures specified, it will be understood that the invention contemplates aging periods of up to one week or more at temperatures as low as 34° F. Also, where a rapid aging process is desirable, it is also possible to heat the sols at elevated temperatures, e.g., 120° to 180° F., thereby allowing the aging process to be completed in shortened periods of time ranging from 1 to about 4 hours.

In the third step of the process, the aged sols are again contacted with a hydrogen form strong acid cation exchange resin. As in the first deionization step, the resin system may be either A, B, or C listed above, with the proviso that the sols must be passes at least once through an anion exchange resin. The second deionization step may be accomplished using either a slurry or column technique. If the sols are to be treated with both an anion and cation resin after the aging step, they may be contacted in any sequence, although the preferred sequence is to treat the sols initially with a cation exchange resin and then with the anion exchange resin. A further deionization technique involves the use of a mixed bed system which contains an intimate admixture of hydrogen form strong acid cation exchange resin and an anion exchange resin.

It is preferred that the anion exchange resin be a strong base resin which is capable of salt-splitting reactions and which also will remove weak acids such as carbonic and lower molecular weight silicic acids from the sols. It is also within the scope of the invention, however, to use a weak base anion exchange resin.

The anion and cation exchange resins can be used in series or in mixed bed. The strong acid cation exchange resins remove cations (predominantly Na). Strong base anion exchange resins remove all anion impurities including weak anions.

There are several strong acid resins that are commercially available which can be used successfully in the subject process. One such product is sold under the trademarks Nalcite HCR and Dowex 50. This product is described in U.S. Pat. No. 2,366,007. The resin is made by the nuclear sulfonation of styrene-divinyl benzene beads. Similarly, there are many strong base resins which can be used in the process. Examples of the materials include the commmercially available Nalcite SBR, Dowex 1, Dowex 2, Dowex 11, and Dowex 21K, Nalcite SBR and Dowex 1 and 2 are described in U.S. Pat. No. 2,591,573. Each of the above exchange resins has a quaternary ammonium type of exchange group. The quaternary ammonium anion exchange resins are highly ionized and can be used over the entire pH range. They are capable of salt-splitting reactions which convert a neutral salt to its corresponding base. A typical weak base anion exchange resin that can be used in the process is "Amberlite IR-4B" which is modified phenolformaldehyde polyamine condensate containing 14% nitrogen and 39.9% water in the basic form of the resin and having an exchange capacity of 10 milli-equivalents per gram of resin. The properties of the resin are described by Kunin and Meyers in the Journal of the American Chemical Society, volume 69, p. 2874, for 1947. Other anion exchangers are described in U.S. Pat. Nos. 2,422,054 and 2,438,230.

The sols produced by treatment with the ion exchange resin system in the first process step are acidic to varying degrees depending upon the particular resin system employed.

It is desirable that the aging process be conducted using sols which do not fluctuate in pH and which do not increase in viscosity. The aging process is most beneficially conducted upon sols having a pH within the range of from 1.5 to not more than 4.5 with a preferred pH ranging between 2.5 and 4.0.

When the hydrogen form strong acid cation exchange resin is used as the ion exchange resin system, the treated sol will have a pH of about 2. When the ion exchange resin system comprises a combination of a hydrogen form strong acid cation exchange resin in conjunction with either a hydroxide form strong or free base form weak base anion exchange resin, the pH of the resultant treated sol will range between 3 to about 5, depending upon the particular resin system employed and the degree of regeneration of the cation exchange resin.

When using both strong acid cation and strong base anion exchange resins, care should be taken to have sufficient regeneration of the cation exchanger in order to prevent too high a pH in the final effluent. At pH values about 6, and especially above 7, the viscosity increase which develops in the strong base resin column will necessitate the use of high pumping pressures.

Of the three ion exchange resin systems discussed above, a hydrogen form strong acid cation exchange resin in combination with a hydroxide form strong base anion exchange resin is most desirable. This combination system is beneficial in removing weakly acidic materials such as carbonic and silicic acids, thereby adding to the stability and purity of the finished product.

As seen, the sol can be passed through a cation or anion exchange resin in either order in order to deionize the resulting silica sol.

Sodium content was run on both deionized and the realkalized silica sols. All values were well below 100 ppm of $Na_2O$.

The resulting deionized silica sol will have a pH ranging from 2 to 5 and will be stable. In certain applications, it may be desirable to have an alkaline silica sol for stability or process conditions. In order to produce alkaline silica sols containing less than 200 ppm of an alkali metal which are the subject of our invention, the ammonium hydroxide used to raise the pH of our sol so as not to introduce any extraneous ions into the system after the deionization which will not be removed by evaporation when the sol is used. Ammonia is used to adjust the pH of the alkali metal free silica sols to a pH in the range of 9 to 10.

During the course of deionization, oftentimes the alkanol amine which is used as the stabilizer and heel will be removed from the resultant sol. In this case it is important that the pH of the silica sol so produced by adjusted after ion exchange with ammonium hydroxide or the like to bring the pH up to approximately 9. Since deionization may remove substantially all of the alkanol amine, and substantially all of the alkali metals present in the sol, molar ratios of $SiO_2$: base (alkanol amine + alkali metal) will range from 1000:1 to higher levels, in using this process it would not be unusual to be able to prepare a sol containing a molar ratio of $SiO_2$:O (alkanol amine + alkali metal) greater than 3,000:1, and oftentimes this ratio will be in excess of 4,000:1.

On realkalizing the deionized colloidal silica sol, it is sometimes necessary to use a mixture of ammonium salts of weak acids to prevent thickening of the product. For a 4 millimicron sol, one need only add enough ammonium hydroxide to bring the pH up to 9. With larger particle size sols it is often necessary to add a small quantity of ammonium carbonate to the product before the addition of the ammonia in order to avoid this problem.

With the use of our invention employing the alkanol amine heel, in a deionized silicic acid solution, occluded sodium is prevented from occurring within the silica sol. This provides to the art a method for preparing substantially alkali metal free silica sols which has been unknown in the past. Much less sodium is occluded in the sols of our invention, and they can be deionized to a greater extent than sols previously prepared.

To further illustrate our invention the following examples are given:

EXAMPLE 1

An alkaline sol was prepared by adding a silicic acid solution containing 7.6% $SiO_2$ to a boiling heel of 9 gm. of 2-aminoethanol in 1500 ml deionized water at such a rate so as to maintain a constant pot volume. After 12 hours, 8 liters of silicic acid solution had been added and 8 liters of water had been removed by evaporation, resulting in a stable sol with the following properties:

| | |
|---|---|
| % $SiO_2$ | 35.5 |
| Specific Gravity | 1.2455 |
| Particle Diameter | 22 mu |
| Mole ratio $SiO_2$:alkanol amine | 60.8 |

This sol was stable for 4 months with no signs of gellation.

EXAMPLE 2

A portion of the alkaline sol prepared in Example 1 was deionized by passing the sol through both cation and anion exchange resins by the method described in U.S. Pat. No. 3,342,747. The product had a final pH of 2.95. Analysis showed less than 70 ppm $Na_2O$ present; thus the product has a $SiO_2/Na_2O$ mole ratio greater than 5000/1. [Sodium stabilized sols such as Nalcoag 1035, when deionized in the same manner, contain about 500 ppm $Na_2O$. This gives a $SiO_2/Na_2O$ mole ratio of 750/1]. After 4 months, these sols show no signs of instability.

EXAMPLE 3

A portion of the acidic sol prepared in Example 2 was realkalized to a pH of 9.6 with $(NH_4)_2CO_3$ and $NH_4OH$ as described in U.S. Pat. No. 3,582,494. No instability was evident after 4 months.

EXAMPLES 4–18

| Example | Heel | Mole ratio $SiO_2$/alkanol amine | Properties | Comments |
|---|---|---|---|---|
| 4. | 50 gm Ethanol Amine<br>1 liter DI $H_2O$ | 8.5 | pH-10.5<br>% $SiO_2$-40<br>P.D.-13 mu | Deionized sol gelled overnight. Alkaline sol stable for at least 3 mo. |
| 5. | 25 gm Ethanol Amine<br>1 liter DI $H_2O$ | 16.2 | pH-10.1<br>$SiO_2$-39% | Deionized sol gelled in 2 weeks Alkaline sol stable for at least 3 mo. Good particle distribution. |
| 6. | 12 gm Ethanol Amine<br>1 liter DI $H_2O$ | 35.2 | pH-9.5<br>$SiO_2$-41% | Deionized sol gelled in 2 mos at room temperature. Large particles, good distribution. |
| 7. | 12 gm Ethanol Amine<br>600 ml Acid Sol (Sp.Gr. 1.041/67% $SiO_2$)<br>400 ml DI $H_2O$ | 29.2 | pH-9.0<br>$SiO_2$-34.5 | Particle size was small as indicated by electron micrograph. |
| 8. | 6 gm Ethanol Amine<br>1 liter DI $H_2O$ | 54.9 | pH-8.6<br>$SiO_2$-32% | |
| 9. | 24 gm Ethanol Amine<br>4 liters DI $H_2O$ | 56.6 | pH-8.75<br>$SiO_2$-33%<br>P.D.-38 mu | |
| 10. | 24 gm Ethanol Amine<br>4 liters DI $H_2O$ | 68.6 | pH-8.70<br>$SiO_2$-40%<br>P.D.-30 mu | |
| 11. | 15 gm Ethanol Amine<br>2500 ml EI $H_2O$ | 63.5 | pH-8.6<br>$SiO_2$-37%<br>P.D.-24 mu | |
| 12. | 15 gm Ethanol Amine<br>650 ml Acid Sol (Sp.Gr. 1.047/7.7% $SiO_2$)<br>1850 ml DI $H_2O$ | 61.8 | pH-8.3<br>$SiO_2$-36%<br>P.D.-18 mu | |
| 13. | 6 gm Ethanol Amine<br>1 liter DI $H_2O$ | 70.3 | pH-8.3<br>$SiO_2$-41%<br>P.D.-21 mu | |
| 14. | 9 gm Ethanol Amine<br>1500 ml DI $H_2O$ | 60.0 | pH-8.5<br>$SiO_2$-35%<br>P.D.-22 mu | |
| 15. | 6 gm Ethanol Amine<br>1 liter DI $H_2O$ | 25.7 | 15% $SiO_2$<br>13 mu | |
| 16. | 36 gm Ethanol Amine<br>1 liter DI $H_2O$<br>Vacuum | 4.1 | pH-10.0<br>$SiO_2$-14%<br>P.D.-3.5 mu | |
| 17. | 36 gm Ethanol Amine<br>1 liter Acid Sol (Sp.Gr. 1.043/7.0% $SiO_2$)<br>Vacuum 25" | 3.7 | pH-10.0<br>$SiO_2$-13.4.5 | |

EXAMPLES 4-18-continued

| Example | Heel | | Mole ratio SiO$_2$/alkanol amine | Properties | Comments |
|---|---|---|---|---|---|
| | 18. | 30 gm Ethanol Amine | 4.9 | | pH-10.0 |
| | 1 liter DI H$_2$O Vacuum | | | SiO$_2$-14% P.D.-3.6 mu | |

The colloidal silica sols of Examples 2-18 were deionized by passing them through HGR-W in the hydrogen form waiting 24 hours, and then passing them through both HGR-W-(H) and SBR-(OH) resins. Sufficient resin was used to remove all unwanted ions. Sodium content of the deionized alkaline sols was in all cases below 100 ppm Na$_2$O. Substantially all of the ethanolamine was also removed from the sols by this process.

We claim:

1. A process for the preparation of an aqueous silica sol containing less than 400 ppm of an alkali metal, having a SiO$_2$ concentration of from 5-55% SiO$_2$ and a surface area of less than 800M$^2$/gram said process comprising the steps of:
    A. providing a 0.1-3.0% aqueous solution of a lower alkanol amine;
    B. heating the aqueous solution of the lower alkanol amine to its boiling point;
    C. adding to the boiling aqueous solution of the lower alkanol amine a 2 to 10% by weight aqueous solution of silicic acid in a volume ratio of silicic acid solution to lower alkanol amine solution of from 3:1 to 7:1, the mole ratio of SiO$_2$ to lower alkanol amine being in the range of from 1:1 to 100:1;
    D. removing water by distillation so as to keep a constant volume as the silicic acid solution is added; and then,
    E. recovering an aqueous colloidal silica sol which contains 5-55% by weight SiO$_2$ having a pH of 8-10 and containing less than 400 ppm of an alkali metal.

2. The process of claim 1 wherein the aqueous solution of silicic acid is added to the aqueous solution of a lower alkanol amine at its boiling point at a reduced pressure.

3. The process of claim 1 wherein the lower alkanol amine is 2-aminoethanol.

4. A process for the preparation of an aqueous silica sol containing less than 200 ppm of an alkali metal having a SiO$_2$ concentration of from 5-55% SiO$_2$ and a surface area of less than 800 M$^2$/gram said process comprising the steps of:
    A. providing a 0.1-3.0% aqueous solution of a lower alkanol amine;
    B. heating the aqueous solution of the lower alkanol amine to its boiling point;
    C. adding to the boiling aqueous solution of the lower alkanol amine a 2 to 10% by weight aqueous solution of silicic acid, the mole ratio of SiO$_2$ to alkanol amine being from 1:1 to 100:1;
    D. removing water by distillation so as to keep a constant volume as the silicic acid solution is added;
    E. recovering an aqueous colloidal silica sol containing 5-55% by weight SiO$_2$ having a pH of 8-10;
    F. passing the aqueous silica sol of Step E above through an ion exchange resin or resins; and then,
    G. recovering a deionized acidic aqueous silica sol containing less than 200 ppm of an alkali metal and having a pH of 2 to 5.

5. The process of claim 4 wherein the ion exchange resin is a cation exchange resin.

6. The process of claim 4 wherein the ion exchange resins are both cation and anion exchange resins, and the cation exchange resin is a strong acid type, and the anion exchange resin is a strong base type.

7. A process for the preparation of an aqueous silica sol containing less than 200 ppm of an alkali metal having a SiO$_2$ concentration of from 5-55% SiO$_2$ and a surface area of less than 800M$^2$/gram said process comprising the steps of:
    A. providing a 0.1-3.0% aqueous solution of a lower alkanol amine;
    B. heating the aqueous solution of the lower alkanol amine to its boiling point;
    C. adding to the boiling aqueous solution of the lower alkanol amine a 2 to 10% by weight aqueous solution of silicic acid, the mole ratio of SiO$_2$ to lower alkanol amine being from 1:1 to 100:1;
    D. removing water by distillation so as to keep a constant volume as the silicic acid solution is added;
    E. recovering an aqueous colloidal silica sol containing 5-55% by weight SiO$_2$ having a pH of 8-10;
    F. passing the aqueous silica sol of Step E above through an ion exchange resin or resins;
    G. recovering a deionized acidic aqueous silica sol containing less than 200 ppm of an alkali metal and having a pH of 2 to 5;
    H. adding to the acidic aqueous silica sol of Step G an aqueous solution of ammonia so as to raise the pH of said silica sol to from 9-10;
    I. recovering a deionized alkaline silica sol containing less than 200 ppm of an alkali metal.

* * * * *